(No Model.)
J. H. KNOWLES.
ICE PLOW.
No. 298,213. Patented May 6, 1884.
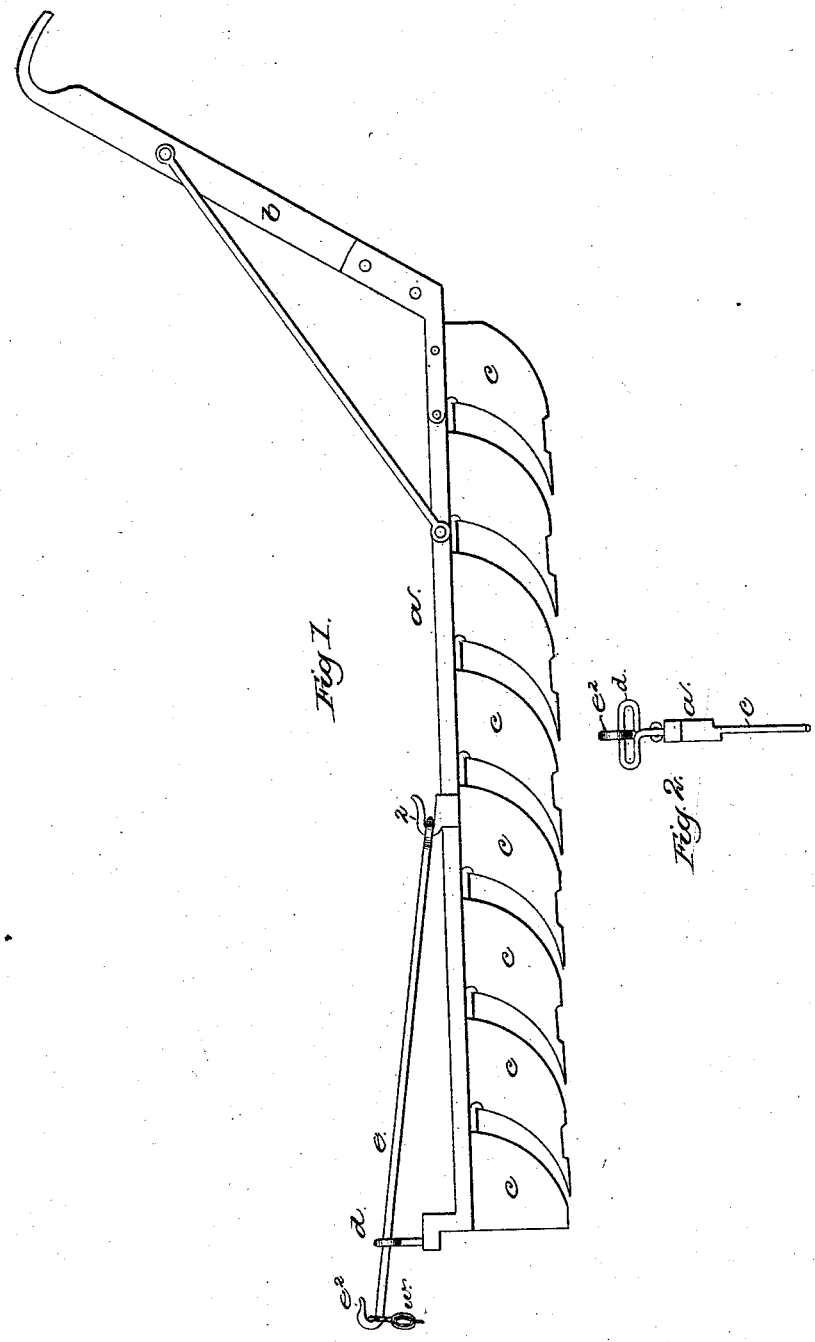

UNITED STATES PATENT OFFICE.

JACOB H. KNOWLES, OF LAWRENCE, MASSACHUSETTS.

ICE-PLOW.

SPECIFICATION forming part of Letters Patent No. 298,213, dated May 6, 1884.

Application filed January 14, 1884. (No model.)

*To all whom it may concern:*

Be it known that I, JACOB H. KNOWLES, of Lawrence, county of Essex, State of Massachusetts, have invented an Improvement in Ice-Plows, of which the following description, in connection with the accompanying drawings, is a specification, like letters on the drawings representing like parts.

In ice-plows as now constructed the whiffletree, with which the traces of the harness on the horse drawing the plow are attached, is connected with the plow by a rope or chain several feet long, the end of the rope or chain farthest from the whiffletree being joined directly to a hook attached to the outer end of the plow-beam. This rope or chain connection is necessary in order that the blade of the plow may be kept down in the ice, as would not be the case were the whiffletree connected with a hook at the end of the plow-beam. When the whiffletree is joined to the end of the plow-beam by a rope or chain, as described, and as common, the length of each cut, made by the plow after each cut is commenced, is less than the distance traveled over by the horse by just the length of the rope or chain used to connect the whiffletree to the end of the plow, for the horse, as soon as he begins to turn, ceases to draw the plow forward in a straight line, and hence it follows that the horse has to travel on the ice a considerable distance beyond the end of the cut made therein by the plow; and one object of my invention is to enable the cut made in the ice to extend more nearly to the point where the horse begins to turn upon the ice to make a new cut. In accordance with my invention, the whiffletree is attached to a suitable hook or eye at the end of a connecting-link, which may be of metal or may be of rope, the inner end of which is attached to the plow-beam at a distance back from its end, substantially as shown, the said connecting-link being permitted to move or swing laterally in a guide at the end of the plow-beam, as will be described.

Figure 1 in side elevation represents an ice-plow embodying my improvement, and Fig. 2 is a view of the front end of the plow.

The plow-beam $a$, handle $b$, and toothed blade $c$ are all substantially as now in common use. The plow-beam $a$, at some distance back from its front end, is provided with a hook, 2, which serves as a means by which to attach the connecting-link $e$ (herein shown as a metal rod) with the plow-beam. At its outer end the beam is provided with a guide, $d$, made to present an extended slot or space in which the connecting-link $e$ may move from side to side as the horse (harnessed as usual, and having the traces of the harness attached to a whiffletree, $w$, and the latter engaged with the hook $e^2$) commences to turn at the completion of a cut, preparatory to changing the plow for another cut.

In the old plan the horse is so far from the plow that it is customary to employ one person to hold the plow and another to drive the horse; but under the arrangement herein shown the horse may be kept so close as to be driven by the man holding the plow. By bringing the horse nearer the plow and attaching the link $e$ to the beam back from its end, as shown and described, the ice may be better utilized or be cut to better economy.

I claim—

1. In an ice-plow, the beam, handles, and blade, combined with a horizontally-swinging link attached loosely to the plow-beam back of its front end, substantially as shown and described, the said link being adapted to hold the usual whiffletrees, and to operate as and for the purpose set forth.

2. In an ice-plow, the beam and the guide $d$ at its front end, combined with the connecting-link $e$, attached to the plow back of the front end of the beam, the said link being extended through the said guide and adapted to hold the whiffletree, substantially as and for the purpose described.

In testimony whereof I have signed my name to this specification in the presence of two subscribing witnesses.

JACOB H. KNOWLES.

Witnesses:
G. W. GREGORY,
B. J. NOYES.